United States Patent
John et al.

(10) Patent No.: US 11,239,988 B2
(45) Date of Patent: Feb. 1, 2022

(54) METHODS AND SYSTEMS FOR SYNCHRONIZATION OF SLAVE DEVICE WITH MASTER DEVICE

(71) Applicant: Texas Instruments Incorporated, Dallas, TX (US)

(72) Inventors: Dantes John, Munich (DE); Aditya Polepeddi, Ahmedabad (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 120 days.

(21) Appl. No.: 16/849,942

(22) Filed: Apr. 15, 2020

(65) Prior Publication Data

US 2020/0336282 A1   Oct. 22, 2020

(30) Foreign Application Priority Data

Apr. 22, 2019   (IN) .............. 201941015838

(51) Int. Cl.
*H04L 7/00*  (2006.01)
*G06F 3/16*  (2006.01)
*H04L 29/08*  (2006.01)

(52) U.S. Cl.
CPC ............ *H04L 7/0008* (2013.01); *G06F 3/162* (2013.01); *H04L 69/326* (2013.01)

(58) Field of Classification Search
CPC ..... G06F 3/162; H04L 69/326; H04L 7/0008; H04L 25/14
See application file for complete search history.

(56) References Cited

U.S. PATENT DOCUMENTS

| | | | | | |
|---|---|---|---|---|---|
| 5,703,877 A | * | 12/1997 | Nuber | ................ | H04N 21/4307 370/395.64 |
| 5,870,388 A | * | 2/1999 | Yung | .................... | H04W 74/085 370/260 |
| 5,881,154 A | * | 3/1999 | Nohara | ..................... | H04L 9/34 380/42 |
| 6,061,655 A | * | 5/2000 | Xue | ................. | G11B 20/10527 704/212 |
| 6,105,114 A | * | 8/2000 | Okuno | ................ | G06F 12/0207 711/155 |
| 8,972,815 B1 | * | 3/2015 | Hwee | .................... | H04L 1/0064 714/752 |
| 10,855,998 B1 | * | 12/2020 | Sarwer | ................... | H04N 19/46 |
| 2001/0016929 A1 | * | 8/2001 | Bonneau | ................ | H04L 7/046 714/735 |

(Continued)

*Primary Examiner* — Dung B Huynh
(74) *Attorney, Agent, or Firm* — John R. Pessetto; Charles A. Brill; Frank D. Cimino

(57) ABSTRACT

Methods and systems for synchronizing a slave device with a master device are disclosed. The method includes arranging a bitstream of data into a two-dimensional frame having a plurality of columns and rows. The method further includes searching the columns for an occurrence of an 8-bit static sync word having a constant sync value. The total number of columns of the two-dimensional frame is equal to the number of columns of a group containing the 8-bit static sync word. The method also includes re-aligning the two-dimensional frame by shifting and re-numbering the column having the 8-bit static sync word to column zero. The method also includes determining the number of rows of the re-aligned frame and synchronizing the slave device with the master device based on the re-aligned frame and the number of columns and rows of the two-dimensional frame.

32 Claims, 10 Drawing Sheets

(56) References Cited

U.S. PATENT DOCUMENTS

| | | | |
|---|---|---|---|
| 2002/0018261 A1* | 2/2002 | Takeguchi | H04Q 11/0478 398/79 |
| 2002/0052989 A1* | 5/2002 | Yamamoto | G06F 13/4269 710/71 |
| 2003/0179769 A1* | 9/2003 | Shi | H04J 3/1694 370/442 |
| 2004/0026511 A1* | 2/2004 | Cheung | G06K 7/1443 235/462.1 |
| 2004/0141002 A1* | 7/2004 | Chun | G06F 3/0481 715/738 |
| 2005/0220180 A1* | 10/2005 | Barlev | H04L 12/2856 375/222 |
| 2005/0226417 A1* | 10/2005 | Kubota | H04N 21/26613 380/228 |
| 2008/0226167 A1* | 9/2008 | Holt | G06T 5/008 382/169 |
| 2009/0037796 A1* | 2/2009 | Kosaki | H03M 13/2732 714/785 |
| 2009/0055196 A1* | 2/2009 | Oh | G10L 19/018 704/500 |
| 2011/0276580 A1* | 11/2011 | Press | G06F 16/243 707/759 |
| 2013/0311848 A1* | 11/2013 | Purohit | H04L 1/0057 714/758 |
| 2014/0149840 A1* | 5/2014 | Magar | G06F 16/21 715/227 |
| 2014/0376634 A1* | 12/2014 | Guo | H04N 19/523 375/240.16 |
| 2018/0020240 A1* | 1/2018 | Han | H04N 19/625 |
| 2018/0027240 A1* | 1/2018 | Huang | H04N 19/91 375/240.12 |
| 2019/0220735 A1* | 7/2019 | Sengupta | G06F 3/0659 |
| 2019/0230361 A1* | 7/2019 | Zhang | H04N 19/176 |
| 2020/0128274 A1* | 4/2020 | Rosewarne | H04N 21/234 |

* cited by examiner

METHODS AND SYSTEMS FOR SYNCHRONIZATION OF SLAVE DEVICE WITH MASTER DEVICE

CROSS REFERENCE TO RELATED APPLICATIONS

This application claims priority from Indian provisional application No. 201941015838, filed Apr. 22, 2019, entitled "FAST SYNCHRONIZATION ALGORITHM FOR SLAVE SYNCHRONIZATION FOR MIPI SOUND-WIRE[SM] PROTOCOL", assigned to the present assignee and incorporated herein by reference.

BACKGROUND

The disclosure generally relates to digital audio interface standards, and particularly to methods and systems for synchronization of a slave device with a master device based on the SoundWire standard.

DESCRIPTION OF THE RELATED ART

The SoundWire standard is a widely used transport protocol for common interface and scalable architecture for digital audio systems. The SoundWire standard optimizes performance, power and noise cancellation. Other benefits of the SoundWire standard are dynamic bandwidth allocation, dual-data rate bus and low latency.

Digital audio systems generally include a host or a master device coupled to one or more slave devices. The host or the master device may be an application processor, a Codec or an audio-visual player that generates digital audio data. The slave device may be an external speaker, an internal speaker, or a microphone coupled to the master device over a SoundWire interface. The master device may send digital audio data in the form of a bitstream of data to the slave device. The serially transmitted bitstream of data is arranged in a variable size, two-dimensional frame based on the SoundWire standard. The slave device is synchronized with the master device by detecting a start of the two-dimensional frames and locking on boundaries of the frames. The slave device can reproduce the digital audio data by detecting the start of the two-dimensional frames and locking on boundaries of the frames. It is desirable to reduce the number of frames required for synchronization, which will allow the slave device to rapidly attach to the master device and to reproduce the digital audio data without significant loss of data.

SUMMARY

Various aspects of the present disclosure are directed to methods and systems for synchronizing a slave device with a master device. In one aspect, a method includes receiving a bitstream of data in a serial transmission and arranging the bitstream of data into a two-dimensional frame having a plurality of columns and rows. The method further includes selecting an initial group of two adjacent columns and searching the even-numbered column for an occurrence of an 8-bit static sync word having a constant sync value. If the 8-bit static sync word is located in the initial group, the total number of columns of the frame is equal to the number of columns of the initial group. If the 8-bit static sync word is not located in the initial group, the method further includes searching in parallel even-numbered columns of successive groups until the 8-bit static sync word is located, wherein each successive group has two adjacent columns added to the previously searched group until a maximum number of columns is reached. The total number of columns of the two-dimensional frame is equal to the number of columns of the group containing the 8-bit static sync word. The method also includes re-aligning the two-dimensional frame by shifting and re-numbering the column containing the 8-bit static sync word to column zero. The method also includes determining the number of rows of the re-aligned frame based on the identified 8-bit static sync word and synchronizing the slave device with the master device based on the re-aligned frame and the number of columns and rows of the frame.

In an additional aspect of the disclosure, the method includes searching column zero for the next occurrence of the 8-bit static sync word. The method further includes identifying a row number corresponding to the matched constant sync value of the 8-bit static sync word based on the next occurrence of the 8-bit static sync word. The method also includes determining the number of rows of the re-aligned frame based on the identified row number.

In an additional aspect of the disclosure, the method includes assigning respective counters to the columns and setting initial count values of the counters to 7, and for each occurrence of a bit of the 8-bit static sync word, decrementing the count value of the corresponding counters by 1. The method also includes identifying the counter having the count value decremented to 0 and identifying the corresponding column, wherein the identified column contains the 8-bit static sync word.

In an additional aspect of the disclosure, a method of synchronizing a slave device coupled to a master device by determining the number of columns and rows of a two-dimensional frame includes receiving a bitstream of data in a serial transmission and arranging the bitstream of data into a two-dimensional frame having a plurality of columns and rows. The method further includes searching an even-numbered column of an initial group and then searching in parallel even-numbered columns of successive groups for an occurrence of an 8-bit static sync word having a constant sync value, wherein the initial group has two adjacent columns and each of the successive groups has two adjacent columns added to the previously searched group until a maximum number of columns is reached. The search is terminated upon locating the 8-bit static sync word. The total number of columns of the two-dimensional frame is equal to the number of columns of the group containing the 8-bit static sync word. The method also includes re-aligning the two-dimensional frame by shifting and re-numbering the column containing the 8-bit static sync word to column zero. The method also includes searching column zero for the next occurrence of the 8-bit static sync word. The method also includes identifying a row number corresponding to the matched constant sync value of the 8-bit static sync word based on the next occurrence of the 8-bit static sync word, and determining the number of rows of the re-aligned frame based on the identified row number.

In an additional aspect of the disclosure, a method of synchronizing a slave device coupled to a master device by determining the number of columns of a two-dimensional frame based on the SoundWire standard includes receiving a bitstream of data in a serial transmission and arranging the serially transmitted bitstream of data into the two-dimensional frame having a plurality of columns and rows. The method also includes searching an even-numbered column of an initial group and then searching in parallel even-numbered columns of successive groups for an occurrence of an 8-bit static sync word having a constant sync value, wherein the initial group has two adjacent columns and each of the successive groups has two adjacent columns added to the previously searched group until a maximum number of columns is reached. The search is terminated upon locating the 8-bit static sync word, and the total number of columns of the two-dimensional frame is equal to the number of columns of the group containing the 8-bit static sync word. The method also includes assigning respective counters to the columns and setting initial count values of the counters to 7, and for each occurrence of a bit of the 8-bit static sync word, decrementing the count value of the corresponding counters by 1. The method also includes identifying the counter having the count value decremented to 0 and identifying the corresponding column, wherein the identified column has the 8-bit static sync word.

In an additional aspect of the disclosure, a finite state machine (FSM) is configured to synchronize a slave device with a master device. The FSM receives a bitstream of data in a serial transmission and arranges the bitstream of data into a two-dimensional frame having a plurality of columns and rows. The FSM searches an even-numbered column of an initial group and then searches in parallel even-numbered columns of successive groups for an occurrence of an 8-bit static sync word having a constant sync value, wherein the initial group has two adjacent columns and each of the successive groups has two adjacent columns added to the previously searched group until a maximum number of columns is reached. The FSM terminates the search upon locating the 8-bit static sync word. The total number of columns of the two-dimensional frame is equal to the number of columns of the group containing the 8-bit static sync word. The FSM also re-aligns the two-dimensional frame by shifting and re-numbering the column having the 8-bit static sync word to column zero and searches column zero for the next occurrence of the 8-bit static sync word. The FSM also identifies a row number corresponding to the matched constant sync value of the 8-bit static sync word based on the next occurrence of the 8-bit static sync word. The FSM determines the number of rows of the re-aligned frame based on the identified row number.

In an additional aspect of the disclosure, a digital audio system includes a master device coupled to one or more slave devices. The system includes a receiver coupled to receive a bitstream of data in a serial transmission and a storage device coupled to the receiver and configured to store the bitstream of data in a two-dimensional frame having a plurality of columns and rows. The system also includes a processor coupled to the storage device. The processor is configured to search an even-numbered column of an initial group and then search in parallel even-numbered columns of successive groups for an occurrence of an 8-bit static sync word having a constant sync value. The processor is configured to select the initial group having two adjacent columns and each of the successive groups having two adjacent columns added to the previously searched group until a maximum number of columns is reached. The processor is configured to terminate the search upon the first occurrence of the 8-bit static sync word, wherein the processor is configured to determine the total number of columns of the two-dimensional frame. The total number of columns is equal to the number of columns of the group containing the 8-bit static sync word.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein. Rather, these descriptions are provided so that this disclosure will satisfy applicable requirements.

Various aspects of the present disclosure are directed to methods and systems for synchronizing a first device with a second device. The first device, also referred to as a master device or a host device, may transmit digital audio data in a bitstream of data to the second device. The second device, also referred to as a slave device, may be an audio headset, a microphone, a Codec, a repeater or an amplifier. The slave device is synchronized with the master device to allow the slave device to reproduce the digital audio data.

In one aspect, the present disclosure is directed to methods and systems for synchronizing a slave device with a master device by locking on boundaries of a two-dimensional frame based on the SoundWire standard. The SoundWire standard requires the master device to send a bitstream of data that is arranged in two-dimensional frames having a configurable frame size. The bitstream of data is transmitted serially over an interface using double data-rate clocking. The slave device is synchronized with the master device by detecting a start of the two-dimensional frames and locking on boundaries of the frames. The slave device can reproduce the digital audio data by detecting the start of the two-dimensional frames and locking on the boundaries of the frames.

Figures 1, 2:
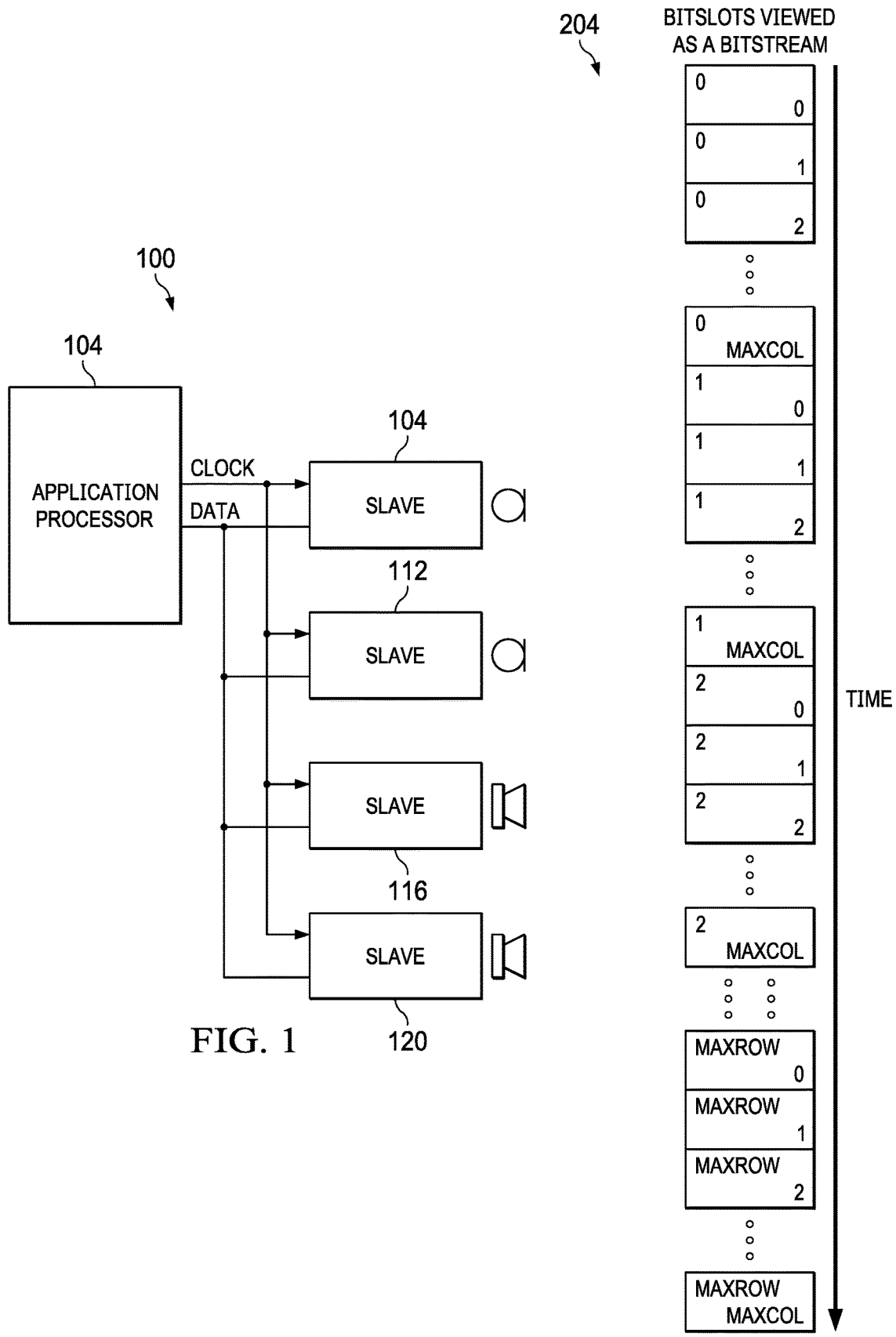
FIG. 1 illustrates an exemplary digital audio system in accordance with the present disclosure.
FIG. 2 shows serial transmission of a bitstream of data.

FIG. 1 illustrates an exemplary digital audio system 100 in accordance with the present disclosure. The audio system 100 includes an application processor configured to operate as a master device 104. The master device 104 generates a bitstream of data which is transmitted to slave devices 108, 112 116, and 120 over a bus. The master device 104 also provides a clock signal to the slave devices 108, 112, 116, and 120 over a separate line.

Figure 3:
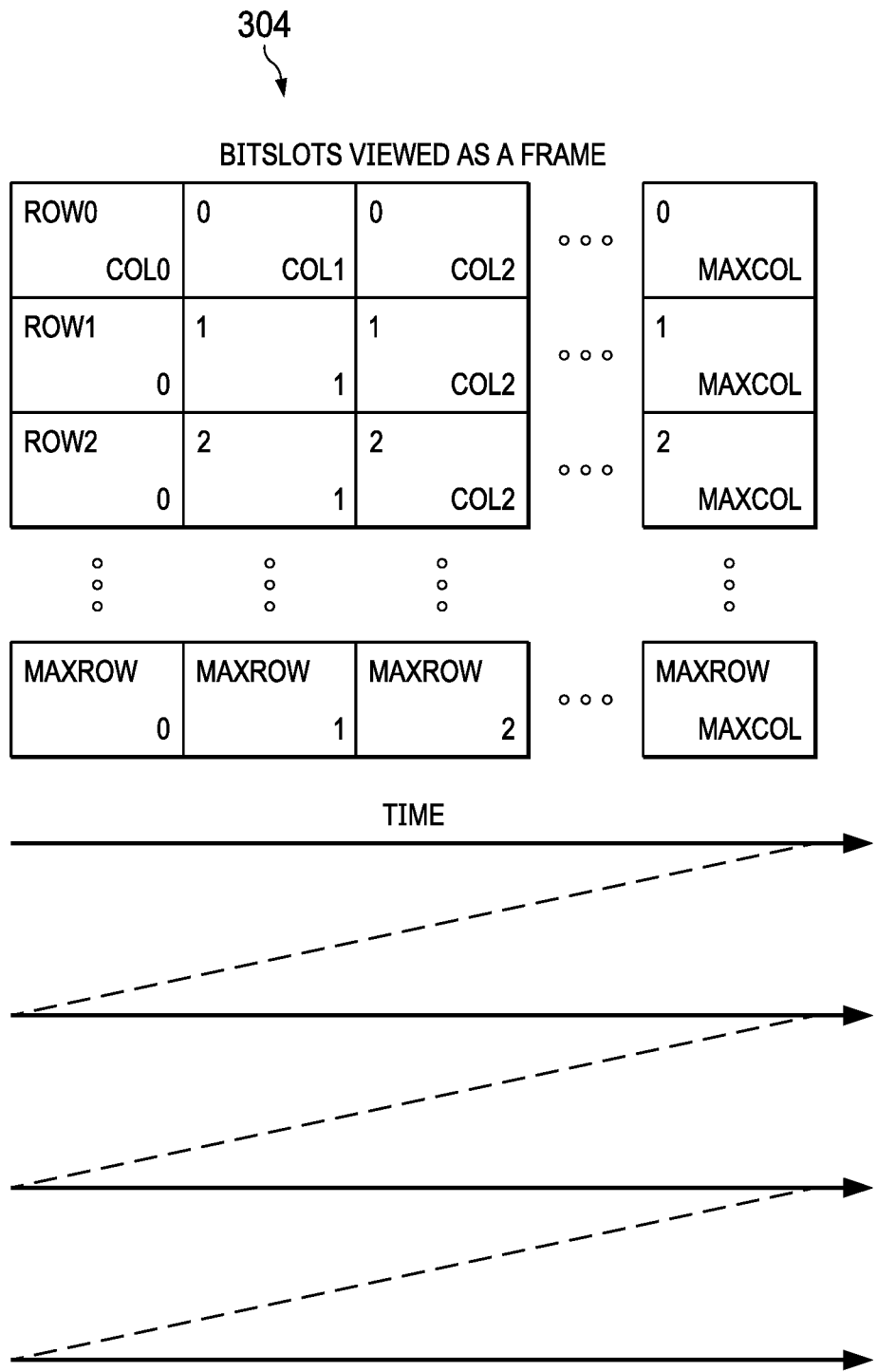
FIGS. 3-5 illustrate two-dimensional frames based on the SoundWire standard.

FIG. 2 shows serial transmission of a bitstream of data 204. The fields (i.e., bitslots) can be viewed as the bitstream in FIG. 2. The serially transmitted bitstream is arranged in a two-dimensional frame 304 shown in FIG. 3. The fields (i.e., bitslots) of the serially transmitted bitstream can be viewed as the two-dimensional frame 304 as it is formed over time. The two-dimensional frame 304 is defined by rows zero-MaxRow and columns zero-MaxCol.

Figure 4:
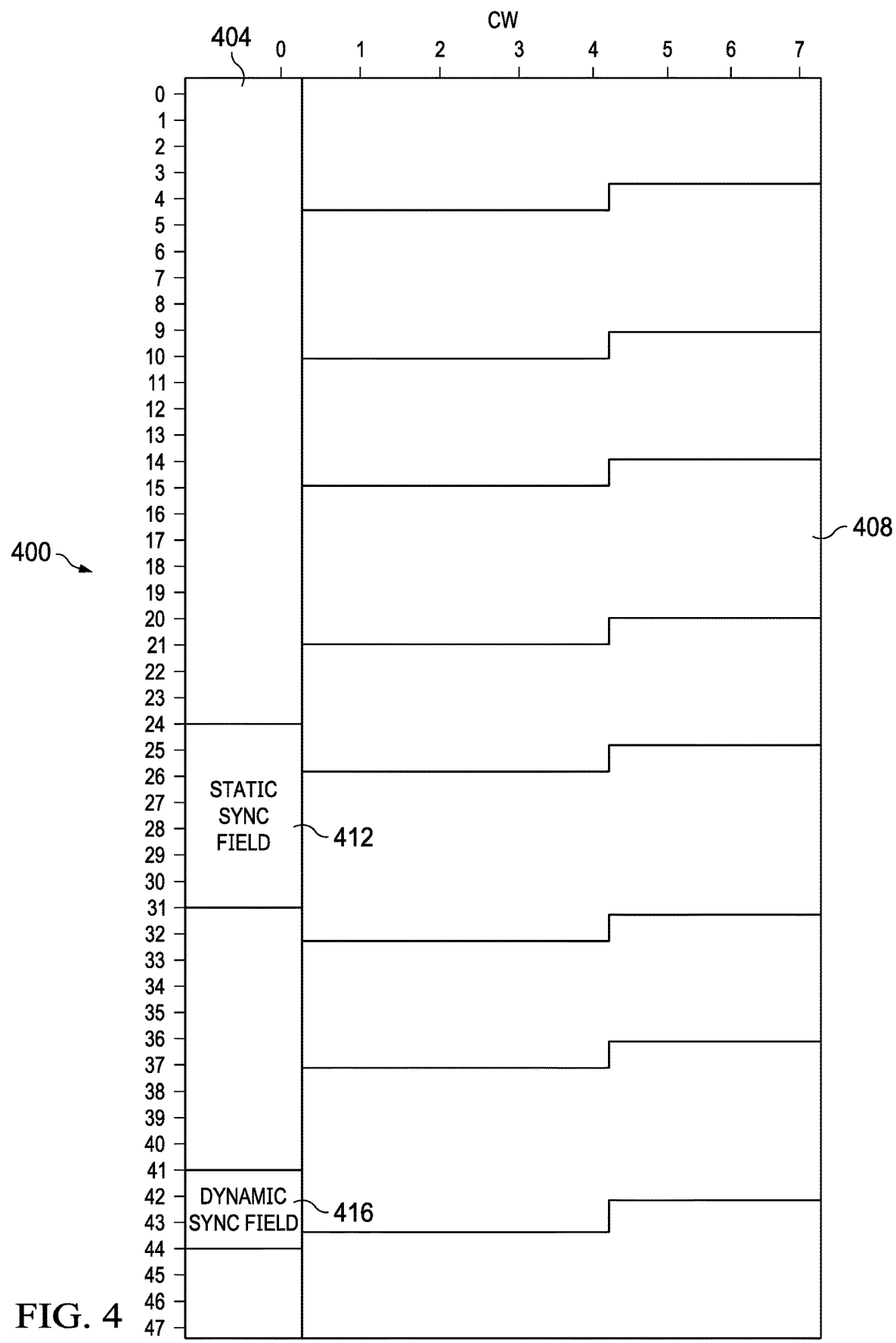
Figure 5:
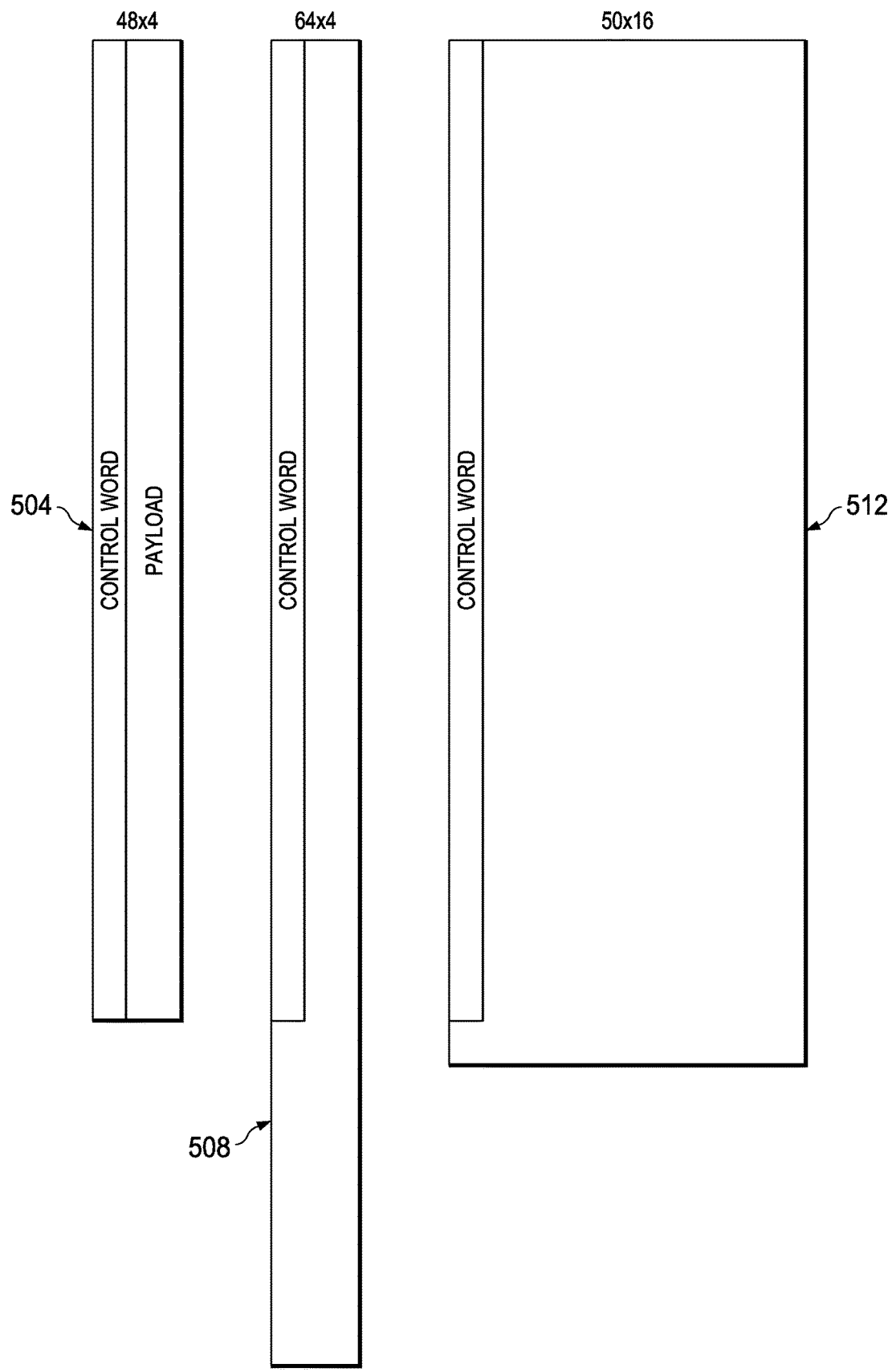

FIG. 4 illustrates a two-dimensional frame 400 based on the SoundWire standard in more detail. The first 48 rows (i.e., row zero-row 47) of column zero are reserved for a Control Word 404 and the other rows and columns are reserved for payload data 408. In the Control Word 404, rows 24-31 are reserved for an 8-bit static sync word 412 and rows 41-44 are reserved for a 4-bit dynamic sync word 416. The 8-bit static sync word 412 has a constant sync value based on the SoundWire standard. The 8-bit static sync word 412 and the 4-bit dynamic sync word 416 are used to synchronize the slave device with the master device, thereby allowing the slave device to lock on the frame boundaries. The SoundWire standard also requires the two-dimensional frame may have 2, 4, 6, 8, 10, 12, 14, or 16 columns and may have a minimum of 48 rows and a maximum of 256 rows. FIG. 5 shows exemplary frames based on the SoundWire standard.

Figure 6:
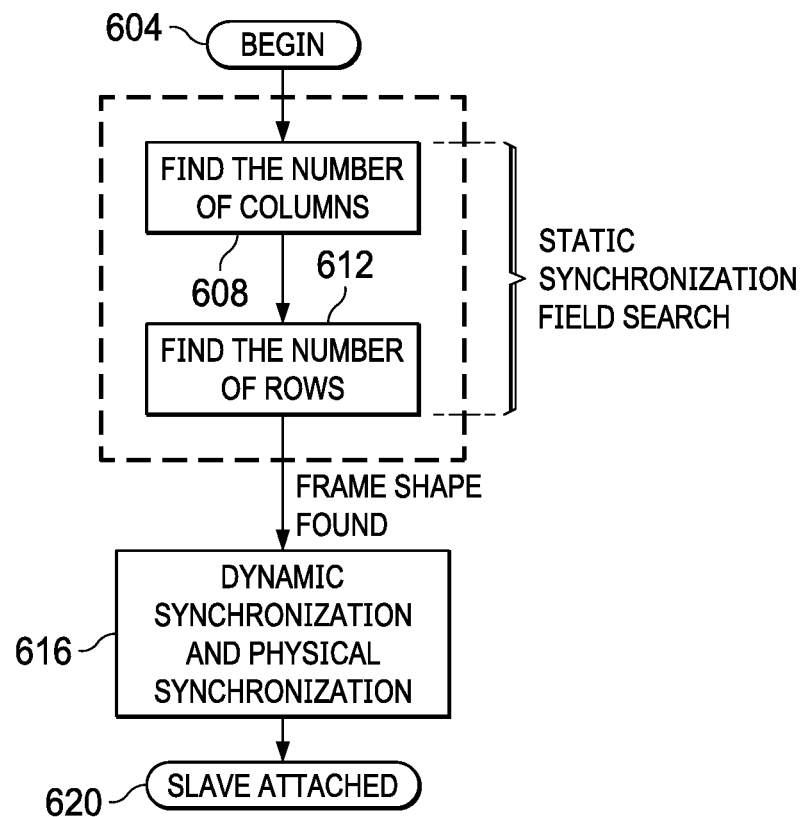
FIG. 6 is a high-level flow diagram of a process of synchronization in accordance with the present disclosure.

FIG. 6 is a high-level flow diagram of the process of synchronization in accordance with an exemplary embodiment of the present disclosure. The flow begins at block 604, and at block 608 the number of columns of a two-dimensional frame is determined. The process at block 608 includes searching bitslots of even-numbered columns for the 8-bit static sync word until the 8-bit static sync word is located. The 8-bit sync word is located if all bits of the 8-bit sync word are matched in a column. The number of columns is determined from the 8-bit static sync word.

Next, at block 612, the number of rows of the frame is determined by using the previously determined number of columns and the 8-bit static sync word. Thereafter, the frame boundaries are defined based on the number of rows and columns and the 8-bit static sync word.

In an additional aspect of the disclosure, at block 616, the bitslots of the column having the 8-bit static sync word is searched for a 4-bit dynamic sync word until the 4-bit dynamic sync word is located. The 4-bit dynamic sync word is located if all of all 4 bits of the dynamic sync word is matched in the column. Also, at block 616 the 1-bit PHY sync word is located. At block 620, the slave device is synchronized (i.e., attached) with the master device.

In one aspect of the present disclosure, even numbered columns of the frame are searched in parallel for an occurrence of the 8-bit static sync word having the constant sync value. Since the SoundWire standard requires column zero to hold the 8-bit static sync word, only even numbered columns are searched. The odd numbered columns are skipped in the search since the 8-bit static sync word cannot be present in the odd numbered columns. By searching the even numbered columns concurrently in parallel, the maximum number of frames searched is reduced by 50%. As a result, the 8-bit static sync word can be rapidly located, allowing the slave device to be synchronized without significant loss of data.

Figure 7:
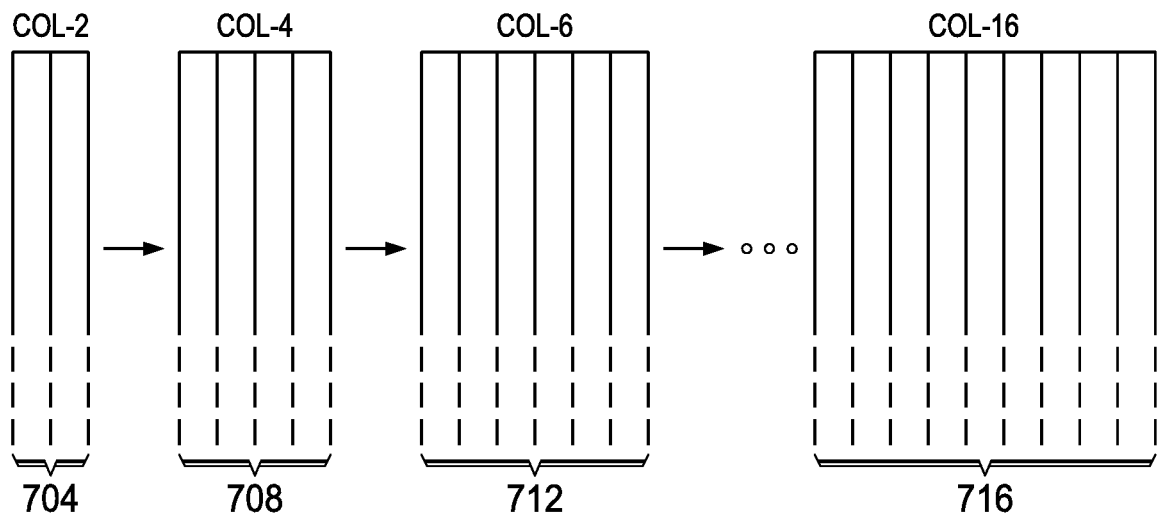
FIGS. 7-8 show processes of searching columns in accordance with the present disclosure.

Initially, a group consisting of two adjacent columns is selected, and the even numbered column of the initial group is searched for an occurrence of the 8-bit static sync word. With reference to FIG. 7, an initial group 704 consisting of two adjacent columns (column zero and column 1) is selected and column zero is searched for the 8-bit static sync word. If the 8-bit static sync word is located in column zero of group 704, the total number of columns of the frame is equal to the number of columns (i.e., 2) of the initial group 704.

With continuing reference to FIG. 7, if the 8-bit static sync word is not located in column zero of the group 704, a next group 708 is selected by adding next two immediately adjacent columns to group 704. In group 704, even numbered columns, i.e., column zero and column two, are searched concurrently for the 8-bit static sync word. If the 8-bit static sync word is located in one of columns of group 708, the total number of columns of the frame is equal to the number of columns (i.e., 4) of group 708.

With continuing reference to FIG. 7, if the 8-bit static sync word is not located in one of the columns of group 708, successive groups are selected by adding two immediately adjacent columns to the previously searched group, and even numbered columns of each successive groups are searched in parallel until the 8-bit static sync word is located. If the 8-bit static sync word is located in one of the columns of the groups, the total number of columns is equal to the number of columns of the group containing the 8-bit static sync word.

With continuing reference to FIG. 7, if the 8-bit static sync word is not located in group 708 which has 4 columns, the next group 712 is selected by adding two immediately adjacent columns to group 708. The process continues until the number of column is 16 which is the maximum number of columns allowable under the SoundWire standard. By way of example, if the static sync word is located in group 712, the number of columns in the frame is 6 because group 712 has 6 columns.

Figure 8:
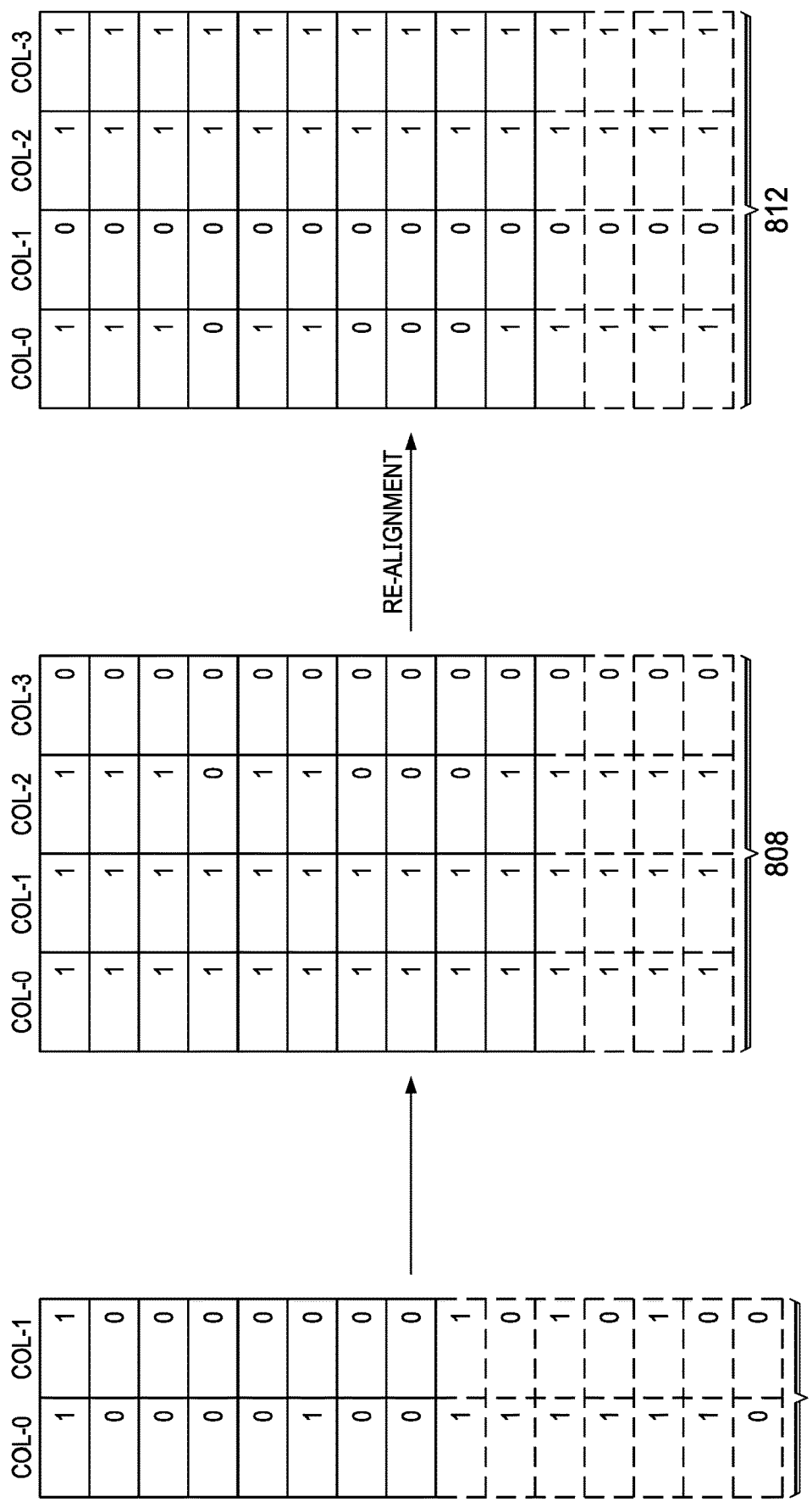

If the 8-bit static sync word is located, the frame is re-aligned by shifting the column containing the 8-bit static sync word and re-numbering the column to column zero. Thus, the re-aligned frame is in compliance with the SoundWire standard which requires column zero has the 8-bit static sync word. With reference to FIG. 8, two frames 804 and 808 are searched, and the 8-bit static sync word is located in column 2 of a frame 808. Accordingly, the frame 804 is re-aligned by moving and re-numbering column 2 to column zero. The re-aligned frame is shown as a frame 812.

Figure 9:
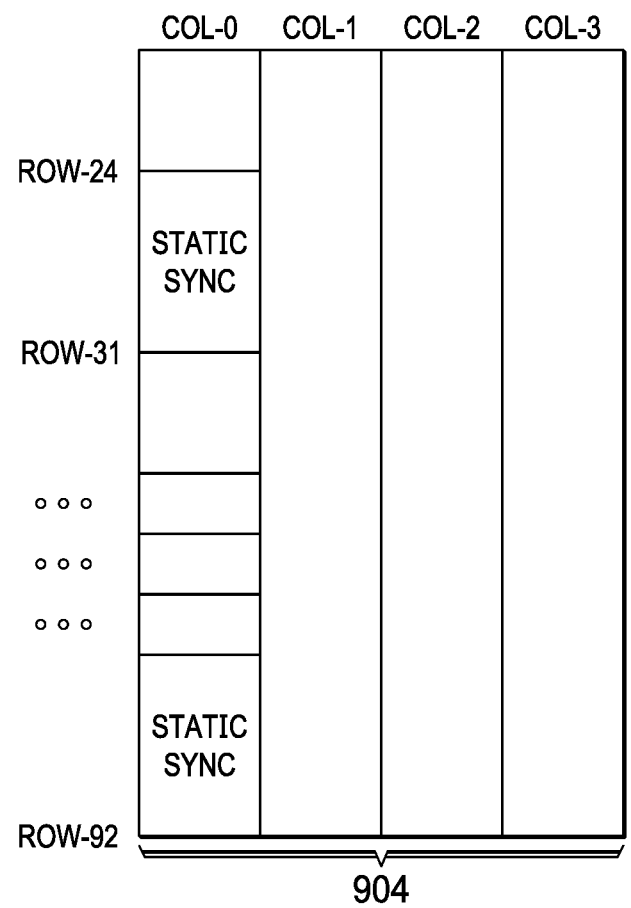
FIG. 9 shows a re-aligned frame in accordance with the present disclosure.

With reference to FIG. 9, a re-aligned frame 904 is illustrated in which column zero has the 8-bit static sync word 808. Since rows 24-31 are reserved for the 8-bit static sync word 808 in accordance with the SoundWire standard, rows 24-31 are identified based on the location of the 8-static sync word. Next, column zero is searched for the next occurrence of the 8-bit sync word. Based on the next occurrence of the 8-bit sync word, the row number of the last bit of the 8-bit sync word is identified. In the exemplary embodiment of FIG. 9, row 92 corresponds to the last bit of the 8-bit static sync word 912. By subtracting the identified row number (i.e., 92) by 32, the total number of rows in the frame is calculated to be 60 (i.e., 92-32).

In some instances, one or more columns of the payload data may have a random 8-bit pattern that is same as the 8-bit static sync word, thus causing a false synchronization. The 4-bit dynamic sync word can be used by the slave device to eliminate a false synchronization within a frame and to verify that the current position is indeed the start of a frame. This approach reduces the likelihood of a false synchronization and helps prevent the slave device from locking on to false starts created by random data.

Figure 10:
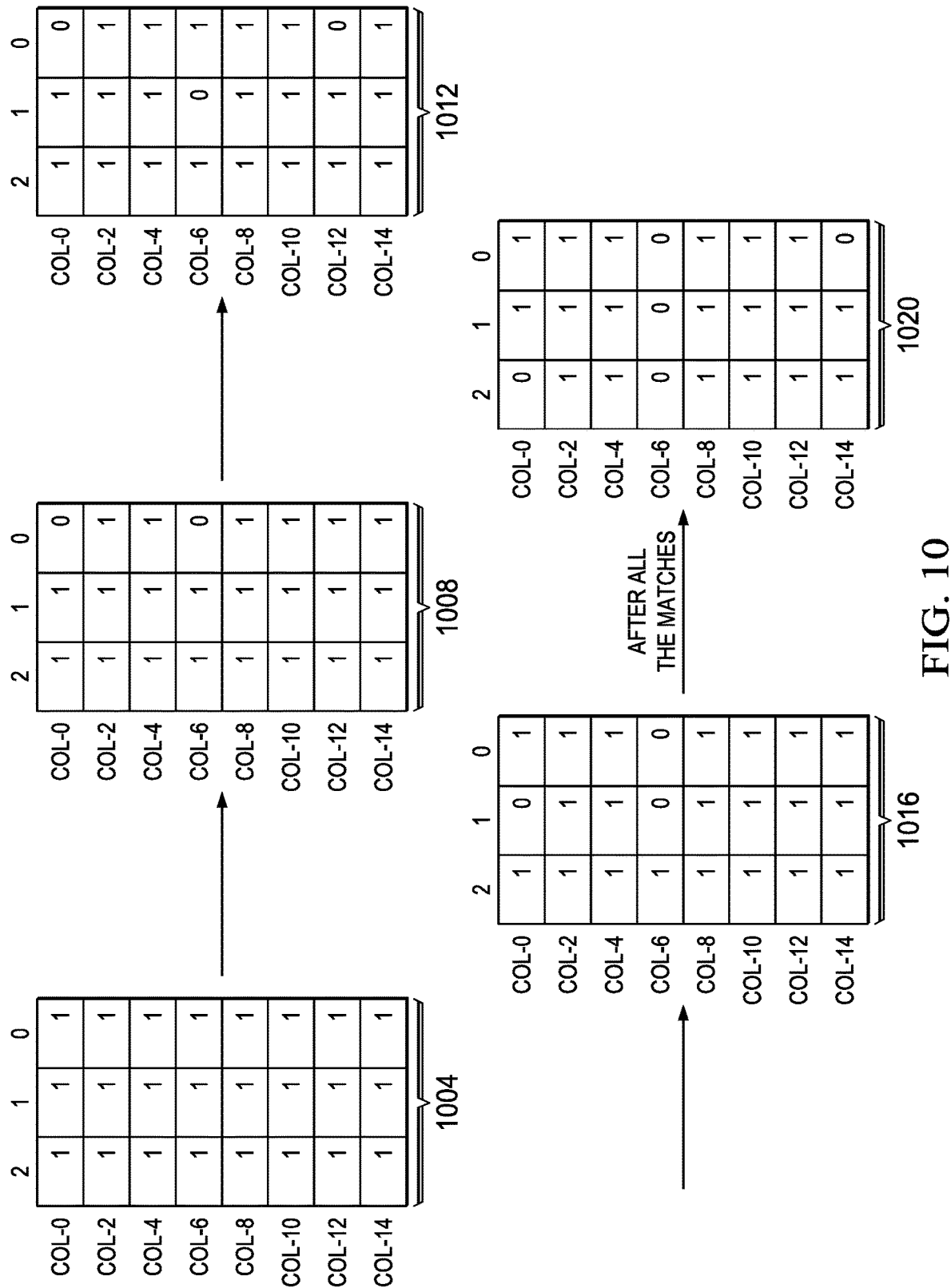
FIG. 10 shows a method of searching columns in accordance with the present disclosure.

FIG. 10 illustrates parallel search of the columns for the 8-bit static sync word in accordance with an exemplary embodiment. By searching the columns in parallel, the slave device is rapidly synchronized with the master device.

As discussed before, the SoundWire standard allows a two-dimensional frame may have 2, 4, 6, 8, 10, 12, 14, or 16 valid columns. In accordance with an exemplary embodiment of the disclosure, even numbered columns of the frame are searched for the first occurrence of the 8-bit static sync word. By searching alternate columns, search time and complexity are reduced. In FIG. 10, Table 1004 shows even numbered columns are searched in parallel. Each even numbered column is assigned a 3-bit counter whose initial count value is set to 7. The counters run in parallel to detect the 8-bit static sync word. As the columns are searched, the count values of the corresponding counters are decremented by 1 if a bit of the 8-bit static sync word is matched. In Table 1008, the count value of the counters corresponding to column zero and column 6 have been decremented by 1 because these columns both have a matched bit of the 8-bit static sync word. The process is continued in Tables 1012-1016. In Table 1020, the count value of the counter corresponding to column 6 has been decremented to zero which indicates that the 8-bit static sync word has been located in column 6. The search is terminated since the 8-bit static sync word is located.

Figure 11:
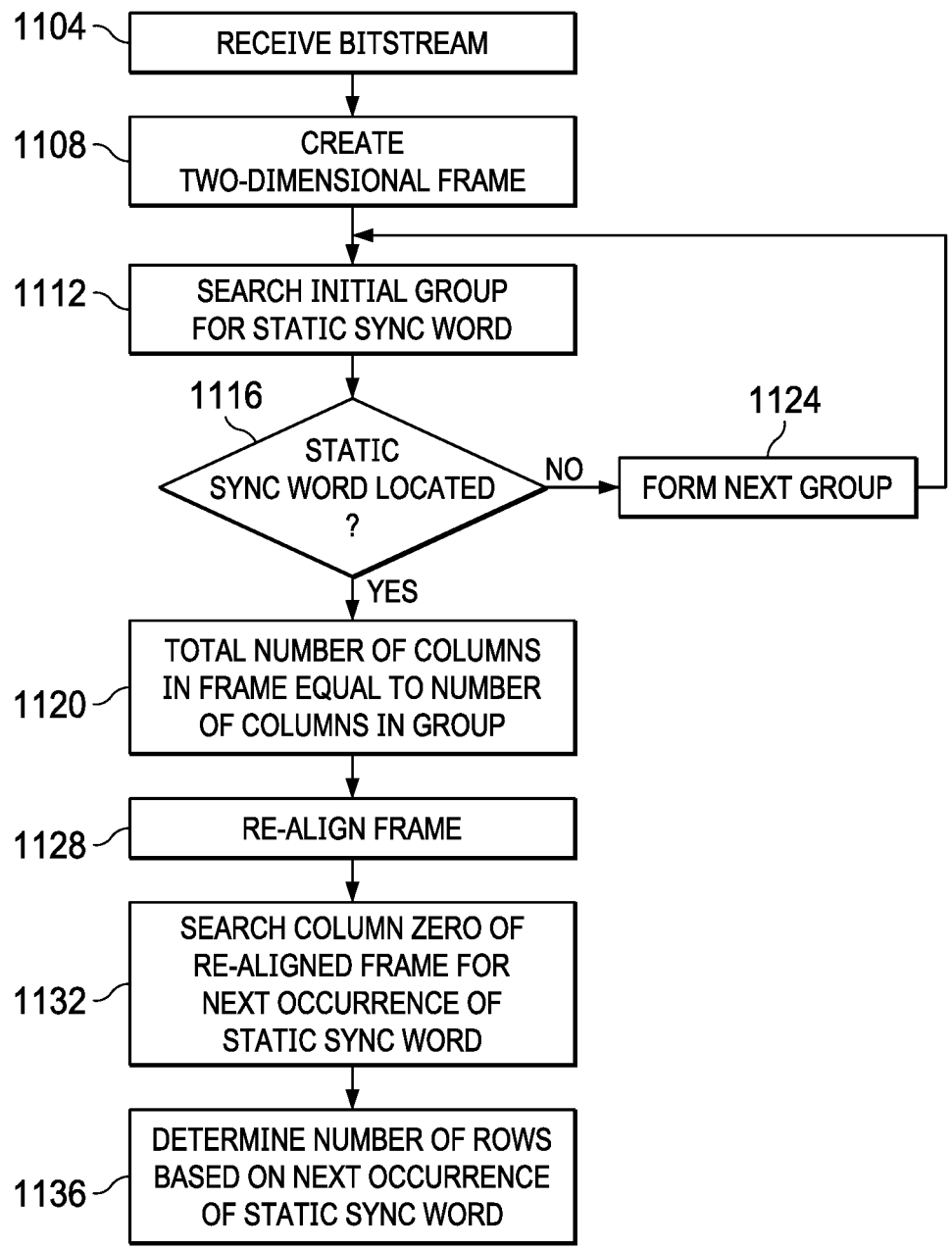
FIG. 11 is a flow diagram of a method of synchronization in accordance with the present disclosure.

FIG. 11 is a flow diagram of a method of synchronization in accordance with an embodiment of the present disclosure. At a block 1104, bitstream of data is received by a slave device. At a block 1108, the bitstream of data is arranged into a two-dimensional frame having a plurality of columns and rows.

At a block 1112, the even-numbered column of an initial group comprising 2 adjacent columns is searched for a first occurrence of the 8-bit static sync word. At a decision block 1116, a determination is made if the 8-bit static sync word has been located in the initial group. If the 8-bit static sync word is located, at a block 1120 the total number of columns in the frame is determined to be equal to the number of columns (i.e., 2) of the initial group.

If the 8-bit static sync word is not located in the initial group, at a block 1124 a next group is formed by adding 2 immediately adjacent columns to the previously searched group and the flow returns to the decision block 1112 where even-numbered columns of the next group are searched. The process is repeated by searching successive groups by adding 2 immediately adjacent columns to the previously searched group until a maximum number of column is reached. If the 8-bit static sync word in located in any one of the successive groups, at the block 1120, the total number of columns in the frame is determined to be equal to the number of columns of the group containing the 8-bit static sync word.

At a block 1128, the two-dimensional frame is re-aligned by shifting and re-numbering the column containing the 8-bit static sync word to column zero. At a block 1132, column zero of the re-aligned frame is searched for the next occurrence of the 8-bit static sync word. At a block 1136, based on the next occurrence of the 8-bit static sync word, the total number of rows is determined.

Figure 12:
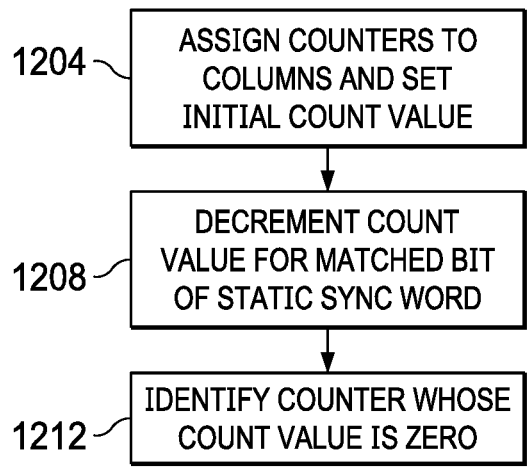
FIG. 12 is a flow diagram of a method of searching a plurality of columns in accordance with the present disclosure.

FIG. 12 is a flow diagram of a method of searching even-numbered columns in accordance with an embodiment of the present disclosure. At a block 1204, the columns are assigned respective counters and initial count values of the counters are set. At a block 1208, the count value of the counters are decremented by 1 for each matched bit of the 8-bit static sync word in the corresponding columns. At a block 1212, the counter whose count value has been decremented to 0 is identified and its corresponding column is identified. The identified column has the 8-bit static sync word.

Figure 13:
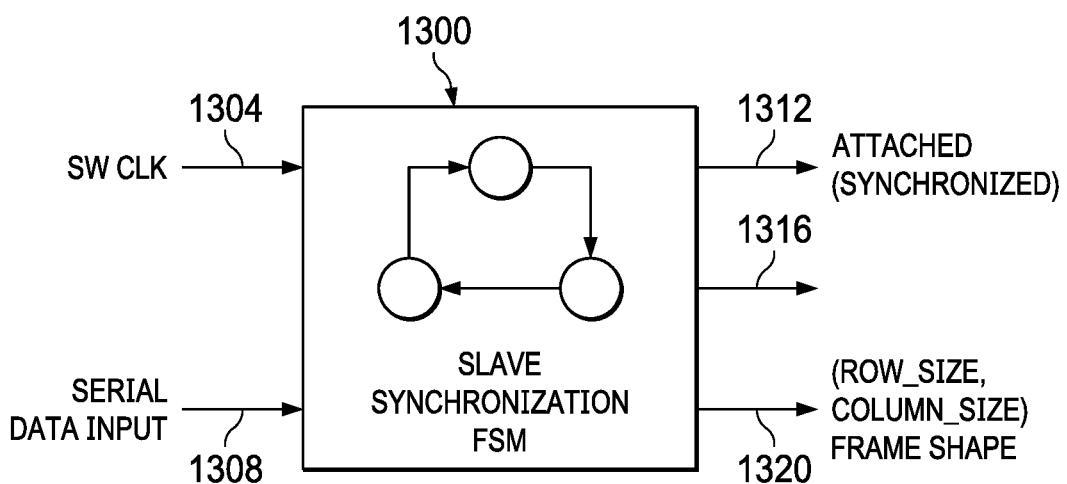
FIG. 13 illustrates a finite state machine in accordance with the present disclosure.

In accordance with an exemplary embodiment of the present disclosure, a finite state machine may be configured for synchronization of the slave device with the master device. FIG. 13 illustrates a finite state machine 1300 which has a first input 1304 that receives SoundWire clock signal and has a second input 1308 that receives a bitstream of data. The bitstream of data is arranged in a two-dimensional frame based on the SoundWire standard. The finite state machine 1300 applies a search algorithm as discussed before to determine the number of columns of the frame by matching the 8-bit static sync word. Using the 8-bit static sync word and the number of columns, the finite state machine determines the number of rows of the frame. The finite state machine 1300 has a first output 1312 to provide a synchronization signal which indicates that the slave device is synchronized. Also, the finite state machine has second and third outputs 1316, 1320 to indicate the number of rows and columns, respectively. In other embodiments of the present disclosure, a processor, an ASIC, an FPGA or software can be configured to determine the number of rows and columns of a frame.

In accordance with an exemplary embodiment, 15 successive frames may be used to match the 4-bit dynamic sync word to prevent ghost synchronization with the payload data. Since a maximum of 8 frames are required to match the 8-bit static sync word and only 1 frame is required for the PHY sync, a total of 24 frames are required to synchronize the slave device with the master device.

In one aspect, the present disclosure is directed to a digital audio system having a master device coupled to one or more slave devices. The master device transmits a bitstream of data to the slave device. The slave device includes a receiver configured to receive a bitstream of data. A storage device coupled to the receiver is configured to store the bitstream of data in a two-dimensional frame having a plurality of columns and rows. A processor coupled to the storage device is configured to search in parallel the columns of an initial group and then successive groups for an occurrence of an 8-bit static sync word having a constant sync value. The processor is also configured to select the initial group having two adjacent columns and each of the successive groups having two adjacent columns added to the previously searched group until a maximum number of columns is reached. The processor is also configured to terminate the parallel search upon the first occurrence of the 8-bit static sync word. The processor is also configured to determine the total number of columns of the two-dimensional frame, wherein the total number of columns is equal to the number of columns of the group in which the 8-bit static sync word is located. The processor is also configured to re-align the two-dimensional frame by shifting and re-numbering the column having the 8-bit static sync word to column zero. The processor is also configured to search column zero and locate the next occurrence of the 8-bit static sync word. The processor is also configured to identify a row number corresponding to the matched constant sync value of the 8-bit static sync word based on the next occurrence of the 8-bit static sync word.

Various illustrative components, blocks, modules, circuits, and steps have been described above in general terms of their functionality. Whether such functionality is implemented as hardware or software depends upon the particular application and design constraints imposed on the overall system. The described functionality may be implemented in varying ways for each particular application, but such implementation decision should not be interpreted as causing a departure from the scope of the present disclosure.

For simplicity and clarity, the full structure and operation of all systems suitable for use with the present disclosure is not being depicted or described herein. Instead, only so much of a system as is unique to the present disclosure or necessary for an understanding of the present disclosure is depicted and described.

What is claimed is:

1. A method of synchronizing a slave device coupled to a master device the method comprising:
   receiving a bitstream of data in a serial transmission;
   arranging the bitstream of data into a two-dimensional frame having a plurality of columns and rows;
   selecting an initial group of two adjacent columns and searching the even-numbered column for an occurrence of an 8-bit static sync word having a constant sync value;
   if the 8-bit static sync word is located in the initial group, the total number of columns of the frame is equal to the number of columns in the initial group;
   if the 8-bit static sync word is not located in the initial group, searching in parallel even-numbered columns of successive groups until the 8-bit static sync word is located, wherein each successive group having two adjacent columns added to the previously searched group until a maximum number of columns is reached, wherein the total number of columns of the two-dimensional frame is equal to the number of columns of the group having the 8-bit static sync word;
   re-aligning the two-dimensional frame by shifting and re-numbering the column having the 8-bit static sync word to column zero;
   determining the number of rows of the re-aligned frame based on the 8-bit static sync word; and
   synchronizing the slave device with the master device based on the re-aligned frame and the number of columns and rows of the two-dimensional frame.

2. The method of claim 1, wherein determining the number of rows comprises:
   searching column zero for the next occurrence of the 8-bit static sync word;
   based on the next occurrence of the 8-bit static sync word, identifying a row number corresponding to the matched constant sync value of the 8-bit static sync word; and
   based on the identified row number, determining the number of rows of the re-aligned frame.

3. The method of claim 1, wherein searching the columns comprises:
   assigning respective counters to the even-numbered columns and setting initial count values of the counters to 7;
   for each occurrence of a bit of the 8-bit static sync word, decrementing the count value of the corresponding counters by 1; and
   identifying the counter having the count value decremented to 0 and identifying the corresponding column, wherein the identified column has the 8-bit static sync word.

4. The method of claim 1, wherein the bitstream of data is serially transmitted by the master device based on the Soundwire standard.

5. The method of claim 1, wherein the serially transmitted bistream of data is arranged into the two-dimensional frame based on the Soundwire standard.

6. The method of claim 1, further comprising terminating the search of the columns upon the first occurrence of the 8-bit static sync word.

7. The method of claim 1, wherein the slave device reproduces digital audio data in the two-dimensional frame after the synchronization.

8. The method of claim 1, wherein the maximum number of columns is 16 and the maximum number of rows is 256.

9. The method of claim 1, wherein the 8-bit static sync word starts at the row numbered 24 and ends at the row numbered 31.

10. A method of synchronizing a slave device coupled to a master device by determining the number of columns and rows of a two-dimensional frame the method comprising:
    receiving a bitstream of data in a serial transmission;
    arranging the bitstream of data into a two-dimensional frame having a plurality of columns and rows;
    searching an even-numbered column of an initial group and then even-numbered columns of successive groups for an occurrence of an 8-bit static sync word having a constant sync value, wherein the initial group having two adjacent columns and each of the successive groups having two adjacent columns added to the previously searched group until a maximum number of columns is reached, wherein the search is terminated upon the occurrence of the 8-bit static sync word, and wherein the total number of columns of the two-dimensional frame is equal to the number of columns of the group containing the 8-bit static sync word;
    re-aligning the two-dimensional frame by shifting and re-numbering the column having the 8-bit static sync word to column zero;
    searching column zero for the next occurrence of the 8-bit static sync word;
    based on the next occurrence of the 8-bit static sync word, identifying a row number corresponding to the matched constant sync value of the 8-bit static sync word; and
    based on the identified row number, determining the number of rows of the re-aligned frame.

11. The method of claim 10, wherein searching the columns comprises:
    assigning respective counters to the even-numbered columns and setting initial count values of the counters to 7;
    for each occurrence of a bit of the 8-bit static sync word, decrementing the count value of the corresponding counters by 1; and
    identifying the counter having the count value decremented to 0 and identifying the corresponding column, wherein the identified column has the 8-bit static sync word.

12. The method of claim 10, wherein the serially transmitted bitstream of data is arranged into the two-dimensional frame based on the Soundwire standard.

13. The method of claim 10, further comprising synchronizing the slave device with the master device based on the re-aligned frame and the number of columns and rows.

14. The method of claim 10, wherein the slave device reproduces digital audio data in the two-dimensional frame after the synchronization.

15. The method of claim 10, wherein the maximum number of column is 16 and the maximum number of rows is 256.

16. A method of synchronizing a slave device coupled to a master device by determining the number of columns of a two-dimensional frame based on the SoundWire standard, the method comprising:
    receiving a bitstream of data in a serial transmission;
    arranging the serially transmitted bitstream of data into the two-dimensional frame having a plurality of columns and rows;
    searching an even-numbered column of an initial group and then even-numbered columns of successive groups for an occurrence of an 8-bit static sync word having a constant sync value, wherein the initial group having two adjacent columns and each of the successive groups having two adjacent columns added to the previously searched group until a maximum number of columns is reached, wherein the search is terminated upon the occurrence of the 8-bit static sync word, and wherein the total number of columns of the two-dimensional frame is equal to the number of columns of the group in which the 8-bit static sync word is located, wherein searching the columns comprises:
assigning respective counters to the even-numbered columns and setting initial count values of the counters to 7;
for each occurrence of a bit of the 8-bit static sync word, decrementing the count value of the corresponding counters by 1; and
identifying the counter having the count value decremented to 0 and identifying the corresponding column, wherein the identified column has the 8-bit static sync word.

17. The method of claim 16, further comprising:
re-aligning the two-dimensional frame by shifting and re-numbering the column having the 8-bit static sync word to column zero;
searching column zero for the next occurrence of the 8-bit static sync word;
based on the next occurrence of the 8-bit static sync word, identifying a row number corresponding to the matched constant sync value of the 8-bit static sync word; and
based on the identified row number, determining the number of rows of the frame.

18. The method of claim 16, further comprising synchronizing the slave device with the master device based on the re-aligned frame and the number of columns and rows.

19. The method of claim 16, wherein the maximum number of columns is 16 and the maximum number of rows is 256.

20. A finite state machine (FSM) configured to synchronize a slave device coupled to a master device, the FSM is configured:
to receive a bitstream of data in a serial transmission;
to arrange the bitstream of data into a two-dimensional frame having a plurality of columns and rows;
to search an even-numbered column of an initial group and then to search even-numbered columns of successive groups for an occurrence of an 8-bit static sync word having a constant sync value, wherein the initial group having two adjacent columns and each of the successive groups having two adjacent columns added to the previously searched group until a maximum number of columns is reached, wherein the search is terminated upon the occurrence of the 8-bit static sync word, and wherein the total number of columns of the two-dimensional frame is equal to the number of columns of the group containing the 8-bit static sync word;
to re-align the two-dimensional frame by shifting and re-numbering the column having the 8-bit static sync word to column zero;
to search column zero for the next occurrence of the 8-bit static sync word;
to identify a row number corresponding to the matched constant sync value of the 8-bit static sync word based on the next occurrence of the 8-bit static sync word; and
to determine the number of rows of the re-aligned frame based on the identified row number.

21. The FSM of claim 20 further configured:
to assign respective counters to the even-numbered columns and to set initial count values of the counters to 7;
to decrement the count value of the counters by 1 for each occurrence of a bit of the 8-bit static sync word; and
to identify the counter having the count value decremented to 0 and to identify the corresponding column, wherein the identified column has the 8-bit static sync word.

22. The FSM of claim 20 further configured to arrange the serially transmitted bitstream of data into the two-dimensional frame based on the Soundwire standard.

23. The FSM of claim 20 further configured to terminate the search of the columns upon the first occurrence of the 8-bit static sync word.

24. The FSM of claim 20 further configured to synchronize the slave device with the master device based on the re-aligned frame and the number of columns and rows.

25. A digital audio system having a master device coupled to one or more slave devices, the system comprising:
a receiver coupled to receive a bitstream of data in a serial transmission;
a storage device coupled to the receiver and configured to store the bitstream of data in a two-dimensional frame having a plurality of columns and rows; and
a processor coupled to the storage device, the processor configured to search an even-numbered column of an initial group and then search even-numbered columns of successive groups for an occurrence of an 8-bit static sync word having a constant sync value, wherein the processor is configured to select the initial group having two adjacent columns and each of the successive groups having two adjacent columns added to the previously searched group until a maximum number of columns is reached, wherein the processor is configured to terminate the search upon the first occurrence of the 8-bit static sync word, and wherein the processor is configured to determine the total number of columns of the two-dimensional frame, wherein the total number of columns is equal to the number of columns of the group containing the 8-bit static sync word.

26. The digital audio system of claim 25, wherein the processor is configured to re-align the two-dimensional frame by shifting and re-numbering the column having the 8-bit static sync word to column zero.

27. The digital audio system of claim 25, wherein the processor is configured to search column zero for the next occurrence of the 8-bit static sync word, and wherein the processor is configured to identify a row number corresponding to the matched constant sync value of the 8-bit static sync word based on the next occurrence of the 8-bit static sync word.

28. The digital audio system of claim 25, wherein the processor is configured to determine the number of rows of the re-aligned frame based on the identified row number.

29. The digital audio system of claim 25, further comprising:
a plurality of counters assigned to respective even-numbered columns, wherein the initial count values of the counters are set to 7.

30. The digital audio system of claim 29, wherein for each occurrence of a bit of the 8-bit static sync word in the columns, the count value of the corresponding counters are decremented by 1, and wherein the counter having the count value decremented to 0 and the corresponding column are identified, and wherein the identified column has the 8-bit static sync word.

31. The system of claim 26, wherein the slave device is synchronized with the master device based on the re-aligned frame and the number of columns and rows.

32. The system of claim 26, wherein the serially transmitted bitstream of data is arranged into the two-dimensional frame based on the SoundWire standard.

* * * * *